(12) United States Patent
Sim

(10) Patent No.: US 10,775,799 B2
(45) Date of Patent: Sep. 15, 2020

(54) AUTONOMOUS CRUISE CONTROL APPARATUS AND METHOD

(71) Applicant: MANDO CORPORATION, Pyeongtaek-si, Gyeonggi-do (KR)

(72) Inventor: Sang Kyun Sim, Anyang-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 53 days.

(21) Appl. No.: 16/160,520

(22) Filed: Oct. 15, 2018

(65) Prior Publication Data

US 2019/0113926 A1 Apr. 18, 2019

(30) Foreign Application Priority Data

Oct. 16, 2017 (KR) .................. 10-2017-0133806

(51) Int. Cl.
*G05D 1/00* (2006.01)
*B60W 30/14* (2006.01)
(Continued)

(52) U.S. Cl.
CPC ....... *G05D 1/0214* (2013.01); *B60W 30/0956* (2013.01); *B60W 30/14* (2013.01);
(Continued)

(58) Field of Classification Search
CPC ............... G05D 1/0214; G05D 1/0088; G05D 2201/0213; G08G 1/096725; G08G 1/166;
(Continued)

(56) References Cited

U.S. PATENT DOCUMENTS 8,798,841 B1 * 8/2014 Nickolaou ......... B62D 15/0265
701/23
8,825,259 B1 * 9/2014 Ferguson ............. G01S 17/931
701/23
(Continued)

FOREIGN PATENT DOCUMENTS

JP 2015-108955 A 6/2015
JP 2016-126701 A 7/2016
(Continued)

OTHER PUBLICATIONS

Korean Office Action dated Nov. 7, 2018 issued in Korean Patent Application No. 10-2017-0133806.

*Primary Examiner* — Khoi H Tran
*Assistant Examiner* — Kyle T Johnson
(74) *Attorney, Agent, or Firm* — Morgan, Lewis & Bockius LLP

(57) ABSTRACT

The present disclosure relates to an autonomous cruise control apparatus and a control method thereof. An embodiment provides an autonomous cruise control apparatus including: a sensing module configured to detect an object adjacent to the vehicle; a vehicle movement distance calculation unit configured to calculate a vehicle movement distance for moving the vehicle to the left or right using a preset method; and a control module configured to perform a control operation to move the vehicle by the vehicle movement distance when movement of a following vehicle behind the vehicle by a preset width or more is detected by the sensing module. Therefore, an emergency vehicle may be allowed to smoothly travel during autonomous cruise control by detecting travel of the emergency vehicle and creating a travel path for the emergency vehicle.

14 Claims, 7 Drawing Sheets

(51) Int. Cl.
*G08G 1/16* (2006.01)
*H04W 4/40* (2018.01)
*G05D 1/02* (2020.01)
*B60W 30/095* (2012.01)
*G08G 1/0967* (2006.01)

(52) U.S. Cl.
CPC ..... *G05D 1/0088* (2013.01); *G08G 1/096725* (2013.01); *H04W 4/40* (2018.02); *B60W 2554/00* (2020.02); *B60W 2554/80* (2020.02); *B60W 2554/801* (2020.02); *G05D 2201/0213* (2013.01); *G08G 1/166* (2013.01)

(58) Field of Classification Search
CPC ............. B60W 30/14; B60W 30/0956; B60W 2550/308; B60W 2550/30; B60W 30/12; H04W 4/40
See application file for complete search history.

(56) References Cited

U.S. PATENT DOCUMENTS

| | | | |
|---|---|---|---|
| 8,838,321 B1* | 9/2014 | Ferguson | B60W 30/18009 701/23 |
| 2008/0275618 A1* | 11/2008 | Grimm | G08G 1/162 701/96 |
| 2011/0190972 A1* | 8/2011 | Timmons | G01C 21/34 701/31.4 |
| 2016/0004254 A1* | 1/2016 | Matsumoto | G05D 1/0077 701/23 |
| 2017/0210379 A1* | 7/2017 | Obata | B60W 30/0956 |
| 2017/0259819 A1* | 9/2017 | Takeda | B60W 10/04 |
| 2018/0015918 A1* | 1/2018 | Bae | B60W 50/16 |
| 2018/0022351 A1* | 1/2018 | Habu | B60W 30/12 701/96 |
| 2018/0032082 A1* | 2/2018 | Shalev-Shwartz | G01C 21/3453 |
| 2018/0141568 A1* | 5/2018 | Singhal | G06Q 30/0266 |
| 2018/0268695 A1* | 9/2018 | Agnew | B60W 30/09 |
| 2018/0286242 A1* | 10/2018 | Talamonti | G05D 1/0214 |
| 2018/0334161 A1* | 11/2018 | Mizuno | B60W 30/00 |
| 2018/0349711 A1* | 12/2018 | Prasad | B60W 40/08 |
| 2019/0113926 A1* | 4/2019 | Sim | G08G 1/096725 |

FOREIGN PATENT DOCUMENTS

| | | |
|---|---|---|
| KR | 10-2016-0004117 A | 1/2016 |
| KR | 10-2016-0078865 A | 7/2016 |

* cited by examiner

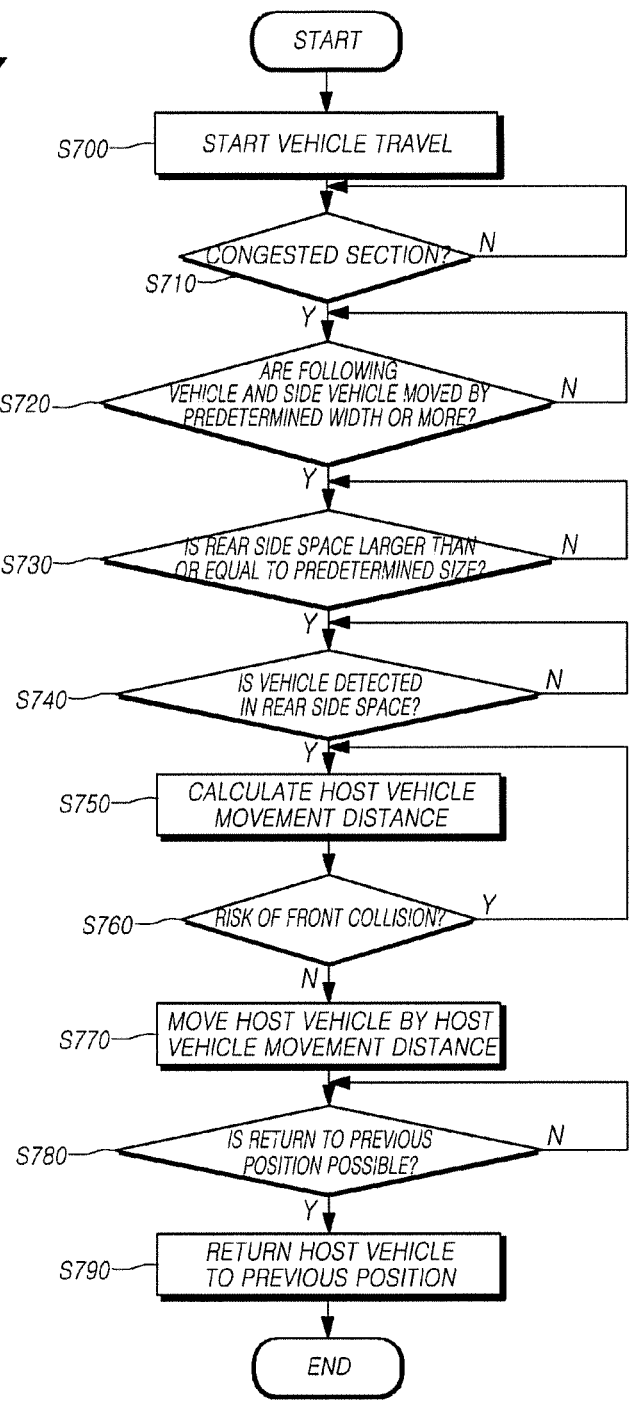

AUTONOMOUS CRUISE CONTROL APPARATUS AND METHOD

CROSS REFERENCE TO RELATED APPLICATION

This application claims priority from Korean Patent Application No. 10-2017-0133806, filed on Oct. 16, 2017, which are hereby incorporated by reference for all purposes as if fully set forth herein.

BACKGROUND OF THE INVENTION

1. Field of the Invention

The present disclosure relates to an autonomous cruise control apparatus and a control method thereof, and more particularly, to an autonomous cruise control apparatus having an emergency vehicle travel path creation function that enables smooth travel of an emergency vehicle by forming a path through which the emergency vehicle can travel when the emergency vehicle approaches from behind during autonomous cruise control, and a control method thereof.

2. Description of the Prior Art

With a rapid increase in use of automobiles in modern society, tens of millions of people are killed or injured by car accidents every year. Accordingly, a variety of automobile technologies, such as an Advanced Driver Assistance System (ADAS) which prevents accidents by using advanced sensors and intelligent video equipment, are being developed to reduce human and economic losses caused by traffic accidents.

The ADAS includes a forward collision warning (FCW) technology, an autonomous cruise control (ACC) technology, a lane change assistance technology, a lane departure warning technology, and a parking assistance technology.

Among these, the autonomous cruise control technology, which is also called smart cruise control, is a technology for automatically detecting a preceding vehicle traveling in the same direction in a driving lane in which a driver is positioned, with the driving lane maintained according to the settings established by the driver, and for automatically traveling at a target velocity while maintaining a safe distance from the preceding vehicle by automatically accelerating or decelerating according to the velocity of the preceding vehicle.

Emergency vehicles, such as ambulances and fire trucks which are operated for patients or emergency services, must arrive at fields requiring urgent measures as quickly as possible. Therefore, when an emergency vehicle is traveling, nearby vehicles change lanes to allow the emergency vehicle to change a lane line, or move close to the lane line if it is difficult to change lanes, to make a path for the emergency vehicle. Particularly, when traffic congestion is severe, nearby vehicles must make a travel path for the emergency vehicle since it is difficult for the emergency vehicle to make a path by itself by changing lanes.

However, a vehicle equipped with the autonomous cruise control technology has a difficulty in identifying the situations of vehicles traveling behind because it is mainly operated by detecting preceding vehicles. Therefore, it is difficult for such vehicles to recognize travel of an emergency vehicle and make a path for the emergency vehicle.

SUMMARY OF THE INVENTION

In this background, the present disclosure is to provide an autonomous cruise control apparatus having an emergency vehicle travel path creation function that enables smooth travel of an emergency vehicle by moving a host vehicle to create a travel path for the emergency vehicle when the emergency vehicle approaches from behind during autonomous cruise control, and a control method thereof.

To solve the preceding problem, an embodiment provides an autonomous cruise control apparatus including: a sensing module including at least an image sensor disposed on a vehicle to have a field of view of an exterior of a vehicle and configured to capture image data to detect an object adjacent to the vehicle; and a controller including a processor configured to process the image data captured by the image sensor, wherein the controller calculates a vehicle movement distance for moving the vehicle to the left or right using a preset method, and, when movement of a following vehicle behind the vehicle by a preset width or more is detected by the sensing module, controls the vehicle to be moved by the vehicle movement distance.

Here, the controller may further determine whether the vehicle is traveling in a congested section and controls the vehicle to move when it is determined that the vehicle is traveling in the congested section and movement of the following vehicle behind the vehicle by a preset width or more in a lateral direction is detected.

In addition, the controller may further determine whether a rear side space of a predetermined size or more allowing an emergency vehicle to travel therethrough is formed on a rear side of the vehicle based on a result of detection from the sensing module and determine to move the vehicle only when the following vehicle is moved by the preset width or more and the rear side space of the predetermined size or more is formed.

An embodiment provides a control method of an autonomous cruise control apparatus, the method including: detecting an object adjacent to a vehicle with a sensing module including at least one of an image sensor and a non-image sensor mounted on the vehicle; calculating a vehicle movement distance for moving the vehicle to the left or right using a preset method; and, when movement of a following vehicle behind the vehicle by a preset width or more is detected, controlling the vehicle to move by the vehicle movement distance.

An embodiment provides an autonomous cruise control apparatus including: a sensing module including at least one of an image sensor disposed on a vehicle to have a field of view of an exterior of the vehicle and configured to capture image data, and a non-image sensor disposed on the vehicle to detect at least one of an object disposed adjacent to the vehicle and configured to capture sensing data; a vehicle dynamics sensor disposed on the vehicle to detect information on travel of the vehicle; and a domain controller configured to process at least one of the image data captured by the image sensor and the sensing data captured by the non-image sensor, wherein, responsive to at least in part to at least one of processing the image data captured by the image sensor and processing the sensing data captured by the non-image sensor, the domain controller calculates a vehicle movement distance for moving the vehicle to the left or right using a preset method, and, when movement of a following vehicle behind the vehicle by a preset width or more is detected by the sensing module, controls the vehicle to be moved by the vehicle movement distance.

According to the present embodiments, the autonomous cruise control apparatus having an emergency vehicle travel path creation function and a control method thereof may allow an emergency vehicle to smoothly travel during autonomous cruise control by detecting travel of the emergency vehicle and creating a travel path for the emergency vehicle. In particular, by creating a travel path for the emergency vehicle in a congested section, the emergency vehicle may be allowed to smoothly travel even in the congested section.

BRIEF DESCRIPTION OF THE DRAWINGS

The above and other aspects, features and advantages of the present disclosure will be more apparent from the following detailed description taken in conjunction with the accompanying drawings, in which:

FIG. 7 is a flowchart illustrating a process of the autonomous cruise control system creating an emergency vehicle travel path according to the present disclosure.

DETAILED DESCRIPTION OF THE EXEMPLARY EMBODIMENTS

Figure 1:
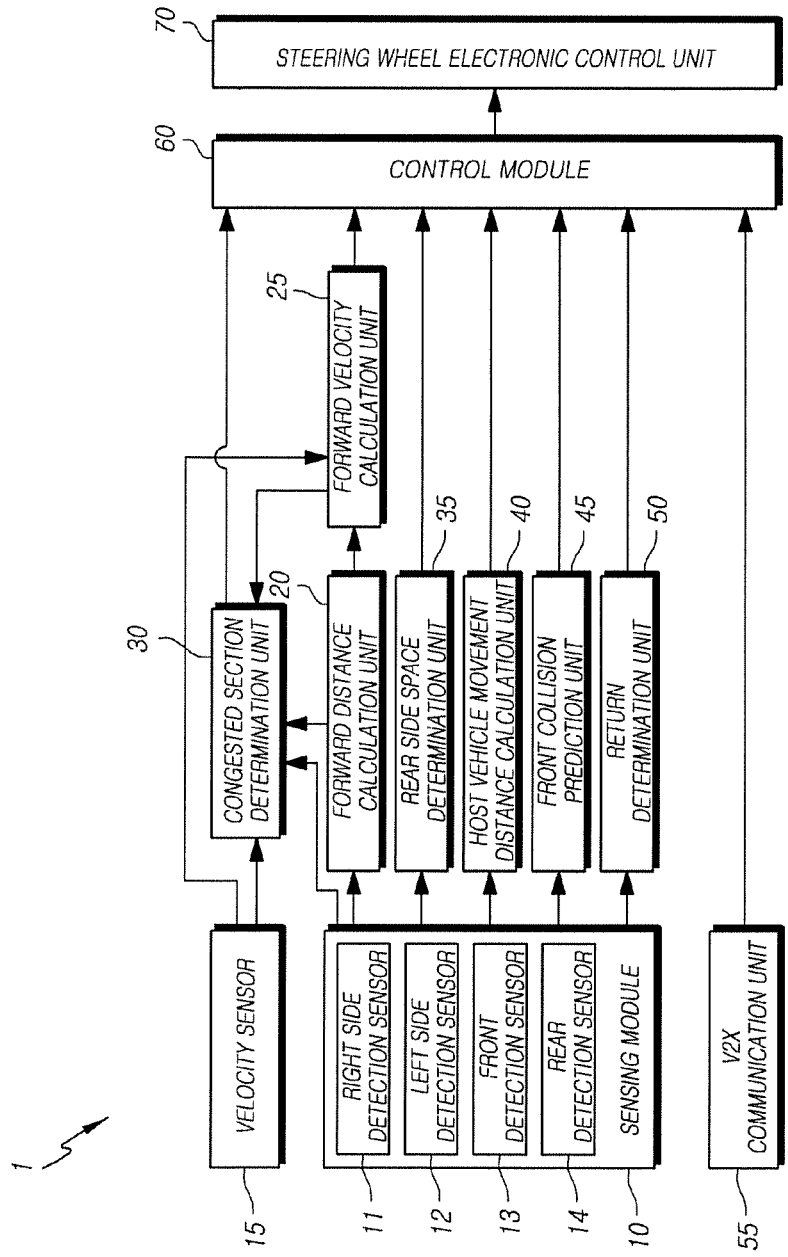
FIG. 1 is a block diagram of a configuration of an autonomous cruise control apparatus according to the present disclosure.

Hereinafter, embodiments of the present disclosure will be described in detail with reference to the accompanying drawings. In adding reference numerals to elements in each drawing, the same elements will be designated by the same reference numerals, if possible, although the elements are shown in different drawings. Further, in the following description of the present disclosure, a detailed description of known functions and configurations incorporated herein will be omitted when it is determined that the description may make the subject matter of the present disclosure rather unclear.

Additionally, in describing the components of the present disclosure, terms like first, second, A, B, (a), and (b) are used. The terms are solely for the purpose of differentiating one component from another, and one of ordinary skill would understand that the terms are not to imply or suggest the substances, order or sequence of the components. When a component is described as "connected," "coupled," or "linked" to another component, one of ordinary skill in the art would understand the components are not necessarily directly connected, coupled, or linked but also may be indirectly "connected," "coupled," or "linked" via a third component.

Figure 2:
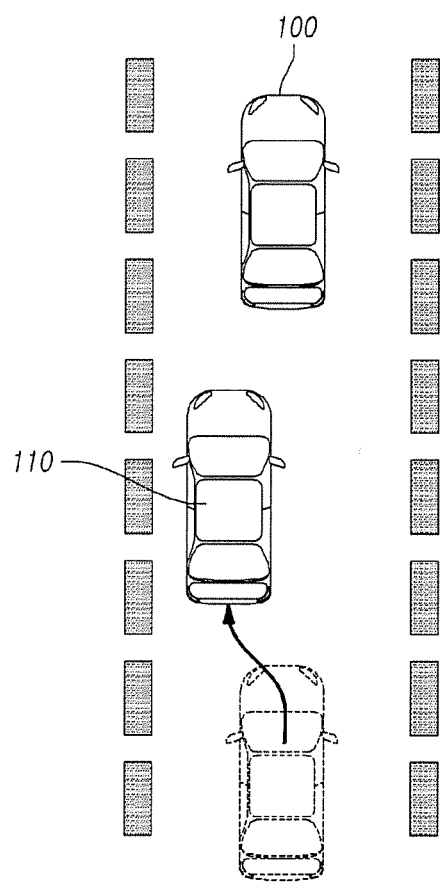
FIG. 2 illustrates a status of a following vehicle that has moved to create a travel path for an emergency vehicle.
Figure 3:
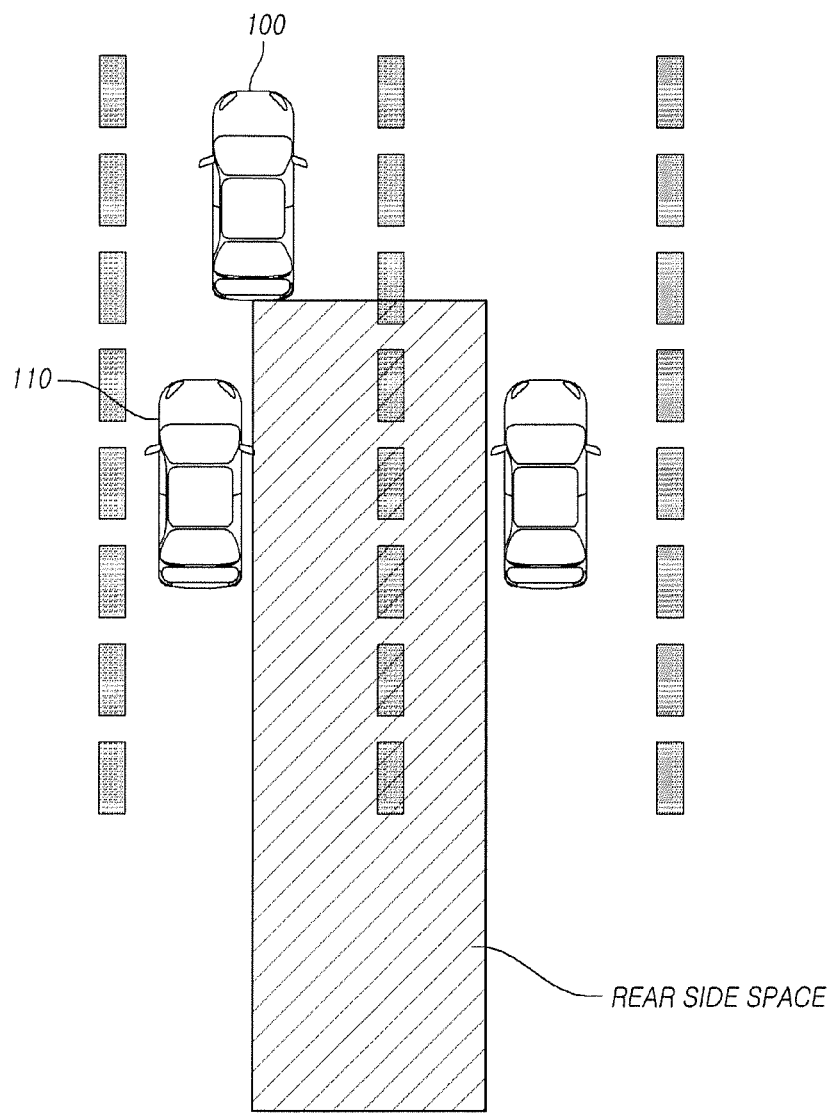
FIG. 3 illustrates a status of the autonomous cruise control apparatus that detects a rear side space thereof according to the present disclosure.
Figure 4:
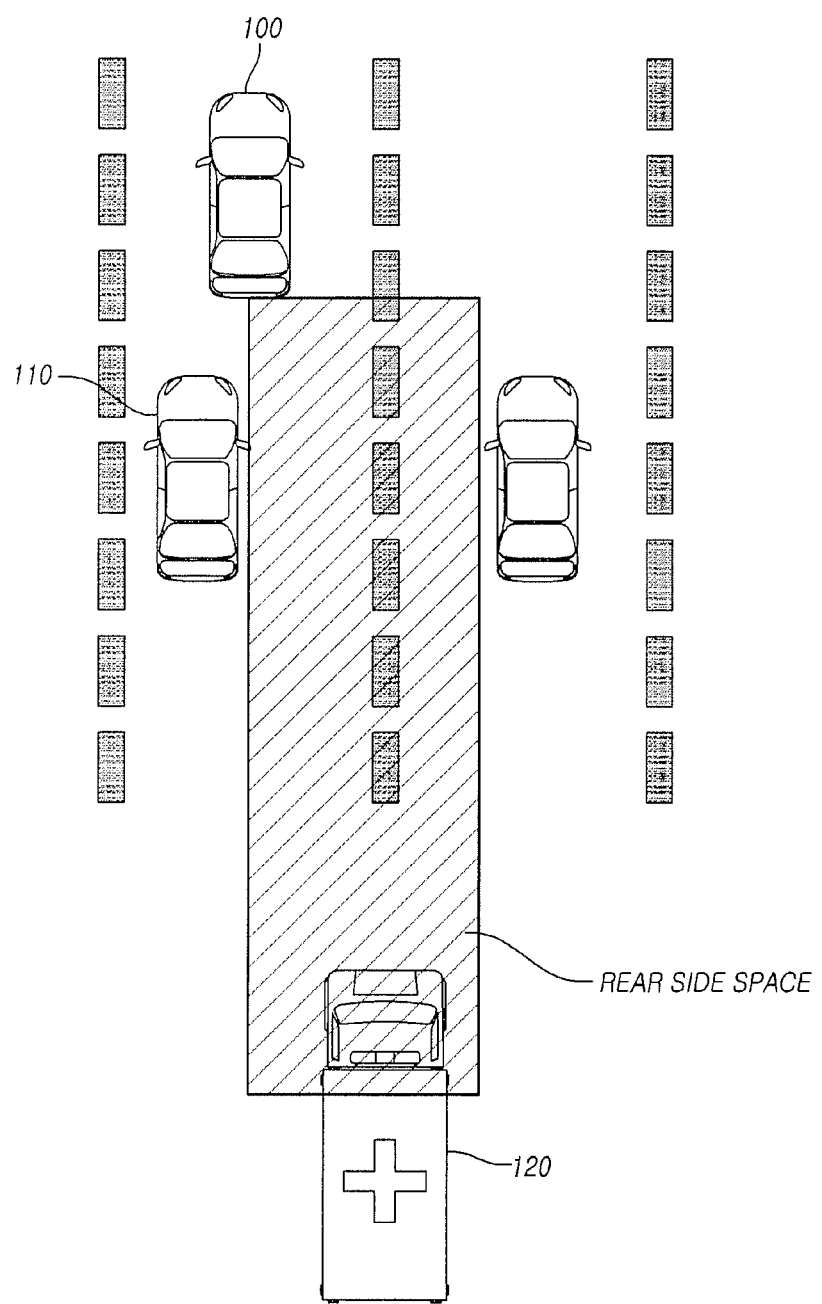
FIG. 4 illustrates a status of the autonomous cruise control apparatus which detects an emergency vehicle that enters the rear side space thereof according to the present disclosure.
Figure 5:
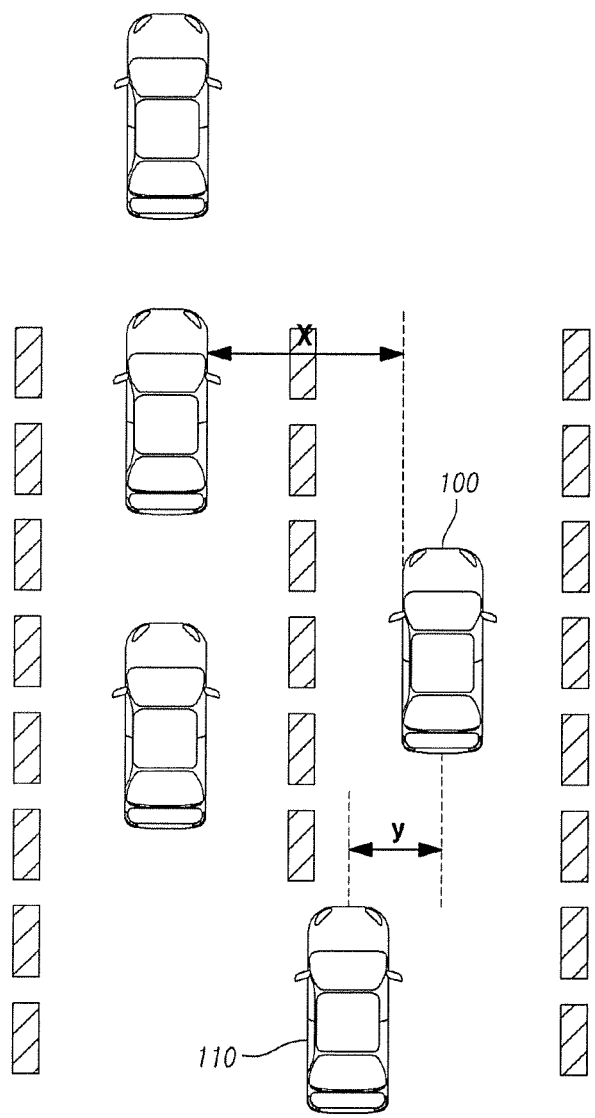
FIG. 5 illustrates a process of determining, by the autonomous cruise control apparatus, a host vehicle movement distance for movement of a host vehicle according to the present disclosure.
Figure 6:
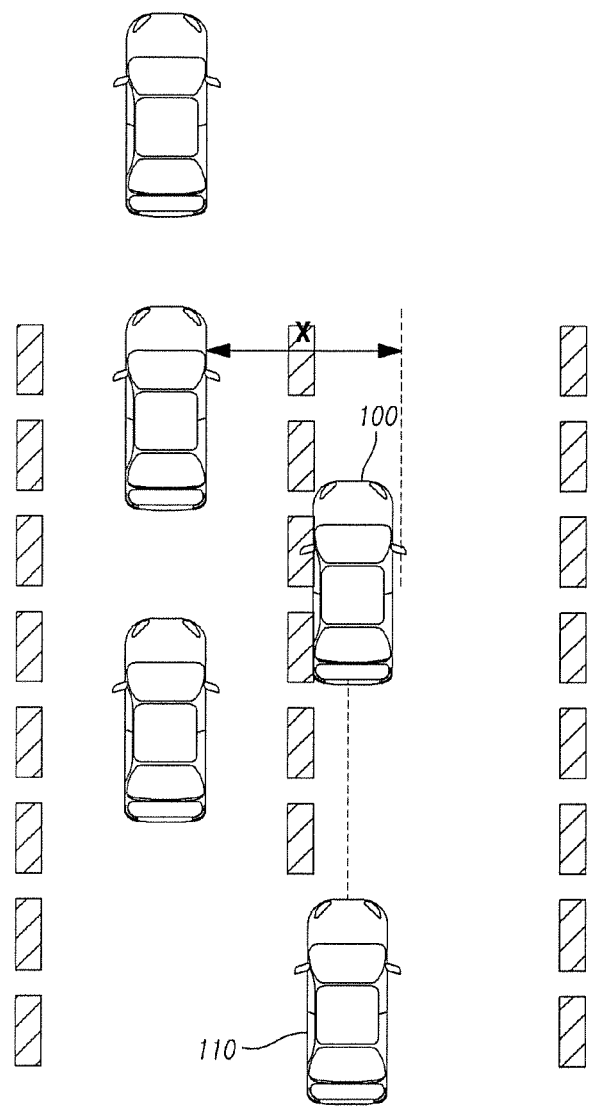
FIG. 6 illustrates a status of the host vehicle which has been moved by a host vehicle movement distance by the autonomous cruise control apparatus according to the present disclosure.

FIG. 1 is a block diagram of a configuration of an autonomous cruise control apparatus according to the present disclosure. FIG. 2 illustrates a status of a following vehicle that has moved to create a travel path for an emergency vehicle. FIG. 3 illustrates a status of the autonomous cruise control apparatus that detects a rear side space thereof according to the present disclosure. FIG. 4 illustrates a status of the autonomous cruise control apparatus which detects an emergency vehicle that enters the rear side space thereof according to the present disclosure. FIG. 5 illustrates a process of determining, by the autonomous cruise control apparatus, a host vehicle movement distance for movement of a host vehicle according to the present disclosure. FIG. 6 illustrates a status of the host vehicle which has been moved by a host vehicle movement distance by the autonomous cruise control apparatus according to the present disclosure.

During use of the autonomous cruise function, the autonomous cruise control apparatus 1 is operable to create a travel path for an emergency vehicle 120 approaching from behind to allow the emergency vehicle 120 to smoothly travel.

The autonomous cruise control apparatus 1 may include a sensing module 10 operable to detect objects on left and right sides and/or ahead of and behind a host vehicle 100, a velocity sensor 15 operable to determine a velocity and travel status of the host vehicle 100, a forward distance calculation unit 20 configured to calculate a distance to a preceding vehicle, a forward velocity calculation unit 25 configured to calculate a velocity of the preceding vehicle, a congested section determination unit 30 configured to determine whether a road on which the host vehicle 100 travels is a congested section, a rear side space determination unit 35 configured to determine whether a space larger than or equal to a predetermined size is formed behind the host vehicle 100 according to a result of detection from the sensing module 10, a host vehicle movement distance calculation unit 40 configured to calculate a distance by which the host vehicle 100 needs to move for travel of the emergency vehicle 120, a front collision prediction unit 45 configured to determine whether there is a possibility of collision with the preceding vehicle, a return determination unit 50 configured to determine whether the host vehicle 100 can return to a previous path after creating the travel path for the emergency vehicle 120, a V2X communication unit 55 configured to communicate with another nearby vehicle or nearby infrastructure equipment, and a control module 60 configured to control the host vehicle 100 to move according to the distance calculated by the host vehicle movement distance calculation unit 40.

While the host vehicle movement distance calculation unit 40 and the control module 60 of the above components are basically included, the forward distance calculation unit 20, the forward velocity calculation unit 25, the congested section determination unit 30, the rear side space determination unit 35, the front collision prediction unit 45, the return determination unit 50, and the V2X communication unit 55 may be selectively included according to some embodiments.

In addition, the host vehicle movement distance calculation unit 40 and the control module 60 may be integrated to function as a single controller. In this case, the controller may include a processor configured to process at least one of image data, which is captured by a camera or an image sensor included in the sensing module, and sensing data captured by a non-image sensor.

As will be described below, the controller may function to calculate a host vehicle movement distance for moving the host vehicle to the left or right using a preset method and to control the host vehicle to move by the host vehicle movement distance when movement of a following vehicle behind the host vehicle by a preset width or more is detected by the sensing module.

The controller may be implemented as a domain control unit (DCU) or domain controller which integrally has a function of receiving and processing information of a plurality of vehicle sensors or relaying transmission and reception of sensor signals and a function of generating a vehicle movement control command according to this embodiment and transmitting the generated command to a vehicle steering control module or a braking control module to control the behavior of the vehicle.

The DCU may function to process at least one of the image data captured by the image sensor and the sensing data captured at the non-image sensor and may calculate a host vehicle movement distance for moving the host vehicle to the left or right using a preset method based on, at least in part, processing of the image data captured by the image sensor and perform a control operation to move the host vehicle by the host vehicle movement distance when movement of a following vehicle behind the host vehicle by a preset width or more is detected by the sensing module.

The sensing module 10 may include a right side detection sensor 11 configured to detect an object on the right side of the vehicle, a left side detection sensor 12 configured to detect an object on the left side of the vehicle, a front detection sensor 13 configured to detect an object in front of the vehicle, and a rear detection sensor 14 configured to detect an object behind the vehicle.

Here, the right side detection sensor 11 and the rear detection sensor 14 may be integrated to form a rear right side detection sensor, and the left side detection sensor 12 and the rear detection sensor 14 may be integrated to form a rear left side detection unit. In this case, the rear right side detection sensor detects objects on the right side of and behind the host vehicle 100, and the rear left side detection sensor detects objects on the left side of and behind the host vehicle 100.

In the present disclosure, for simplicity, an example case where the right side detection sensor 11, the left side detection sensor 12, the front detection sensor 13, and the rear detection sensor 14 are configured will be described. Here, one or more right side detection sensors 11, one or more left side detection sensors 12, one or more front detection sensors 13, and one or more rear detection sensors 14 may be configured. The front detection sensor 13 and the rear detection sensor 14 may be mounted on a grille, a trunk, a bumper, or the like of the vehicle. A plurality of front detection sensors 13 and a plurality of rear detection sensors 14 may be mounted on the grille, trunk, or bumper at constant intervals in a lateral direction.

The right side detection sensor 11, the left side detection sensor 12, the front detection sensor 13 and the rear detection sensor 14 may include various types of sensors. For example, they may include at least one of a laser sensor, an ultrasonic sensor, and a camera.

The sensing module 10 according to this embodiment may include at least one of an image sensor disposed on a vehicle so as to have a field of view of an exterior of a vehicle, the image sensor capturing image data, and a non-image sensor disposed on the vehicle so as to detect at least one of objects disposed adjacent to the vehicle, the non-image sensor capturing sensing data.

The vehicle camera according to this embodiment may be represented by another term such as an image system, a vision system, an image sensor, or the like. The vehicle camera may include a front camera having a field of view of a front view of the vehicle, a rear camera having a field of view of a rear view of the vehicle, and a rear-side camera having a field of view of a side view or rear-side view of the vehicle and may selectively include at least one of the above-described cameras oriented in various directions in some cases.

Such cameras may function to capture image data about the surroundings of the vehicle and transmit the captured image data to a processor or a controller. The vision system or the image sensor according to this embodiment may further include an electronic control unit (ECU) or an image processor having a function of processing the captured image data and displaying the captured image data on a display or the like.

In addition, the vision system or the image sensor according to this embodiment may further include an appropriate data link or communication link such as a vehicle network bus for data transmission or signal communication from the camera to the image processor. The vehicle to which this embodiment is applied may further include a non-image sensor such as a radar sensor or an ultrasonic sensor.

When the right side detection sensor 11, the left side detection sensor 12, the front detection sensor 13 and the rear detection sensor 14 are provided as laser sensors and ultrasonic sensors, they may emit laser or an ultrasonic wave and may then detect an external object and determine a distance to the object using the laser or ultrasonic wave reflected from the object.

For example, when a laser sensor is employed, the laser sensor may include a light-emitting unit configured to emit a laser beam and a light-receiving unit configured to receive a laser beam reflected from another vehicle or an object, and the distance that the laser beam travels may be calculated using the difference between the time at which the laser beam is emitted and the time at which the laser beam reflected from a preceding vehicle is received by the light-receiving unit.

Therefore, vehicles or objects traveling ahead of and behind the host vehicle 100 and a vehicle or an object traveling in a lane on the right or left side of the host vehicle 100 may be detected using a laser beam or an ultrasonic wave reflected from the objects on the left and right sides of, ahead of, and behind the host vehicle 100. Using the detected information, the distance between the detected vehicle or object and the host vehicle 100 may be calculated.

The radar sensor or the radar system employed in the present disclosure may include at least one radar sensor unit, for example, at least one of a front detection radar sensor mounted on the front of the vehicle, a rear radar sensor mounted on the back of the vehicle, and side or rear side detection radar sensors mounted on the sides of the vehicle. The radar sensor or radar system may analyze transmitted and received signals to process data, thereby detecting information about an object. To this end, the radar sensor or radar system may include an ECU or a processor. Data transmission or signal communication from the radar sensor to the ECU may be performed through a communication link such as an appropriate vehicle network bus.

The radar sensor includes include one or more transmit antennas configured to transmit a radar signal and one or more receive antennas configured to receive a reflected signal received from the object.

The radar sensor according to this embodiment may adopt a multi-dimensional antenna array and a multiple input multiple output (MIMO) signal transmission/reception scheme to form a virtual antenna aperture larger than an actual antenna aperture.

For example, to achieve horizontal and vertical angular precision and resolution, a two-dimensional antenna array is used. Using the two-dimensional radar antenna array, signals may be transmitted and received by performing two (time-multiplexed) scans individually horizontally and vertically, and MIMO may be used separately from (time-multiplexing of) the two-dimensional radar horizontal and vertical scans.

More specifically, the radar sensor according to this embodiment may adopt a two-dimensional antenna array configured by a transmit antenna unit including a total of 12 transmit antennas Tx and a receive antenna unit including 16 receive antennas Rx and therefore have an arrangement of 192 virtual receive antennas in total.

In this case, the transmit antenna unit has three transmit antenna groups each including four transmit antennas, wherein a first transmit antenna group may be spaced apart from the second transmit antenna group by a predetermined distance in the vertical direction, and the first or second transmit antenna group may be spaced apart from the third transmit antenna group by a predetermined distance D in the horizontal direction.

In addition, the receive antenna unit may include four receive antenna groups each including four receive antennas, wherein the receive antenna groups may be arranged to be spaced apart from each other in the vertical direction. The receive antenna unit may be disposed between the first transmit antenna group and the third transmit antenna group, which are spaced apart from each other in the horizontal direction.

In another embodiment, the antennas of the radar sensor may be arranged in a two-dimensional antenna array. For example, each antenna patch may have a rhombus arrangement, thereby reducing unnecessary side lobes.

Alternatively, the two-dimensional antenna array may include a V-shaped antenna array in which a plurality of radiation patches are arranged in a V-shape. More specifically, the two-dimensional antenna array may include two V-shaped antenna arrays. In this case, a single feed is performed through the apex of each V-shaped antenna array.

Alternatively, the two-dimensional antenna arrangement may include an X-shaped antenna array in which a plurality of radiation patches is arranged in an X-shape. More specifically, the two-dimensional antenna array may include two X-shaped antenna arrays. In this case, a single feed is made to the center of each X-shaped antenna array.

In addition, the radar sensor according to this embodiment may employ a MIMO antenna system in order to realize detection accuracy or resolution in vertical and horizontal directions.

More specifically, in the MIMO system, each transmit antenna may transmit a signal having an independent distinct waveform. That is, each transmit antenna transmits a signal of an independent waveform differentiated from the other transmit antennas, and each receive antenna may determine a transmit antenna, from which a reflected signal reflected from an object has been transmitted, based on the different waveforms of the signals.

In addition, the radar sensor according to this embodiment may include a radar housing configured to accommodate a circuit and a substrate including transmit/receive antennas and include a radome configured to define an appearance of the radar housing. Here, the radome may be formed of a material which can minimally attenuate transmitted and received radar signals. The radome may be formed using the front and rear bumpers, the grille, or the side body of the vehicle, or the outer surface of a vehicle component.

That is, the radome of the radar sensor may be disposed inside the grille, bumper, vehicle body, or the like of the vehicle and may be disposed as a part of a component constituting an outer surface of the vehicle, such as the grille, bumpers, or a vehicle body part of the vehicle. Thereby, the radome may enhance aesthetics of the vehicle and provide convenience in mounting the radar sensor.

The autonomous cruise control apparatus may further include a vehicle dynamics sensor disposed on the vehicle to detect information related to travel of the vehicle. A velocity sensor 15 may be used as one of the vehicle dynamics sensors.

The velocity sensor 15, which is a sensor configured to detect a travel velocity of the host vehicle 100, may employ a reed switch, a Hall sensor, a magnetic sensor, or the like and may determine the velocity of the vehicle and whether the vehicle is in an idling mode or a travel mode using a pulse signal generated by rotation of the wheels. The travel velocity of the host vehicle 100 detected by the velocity sensor 15 may be provided to the congested section determination unit 30.

When a preceding vehicle is detected by the front detection sensor 13, the forward distance calculation unit 20 calculates the distance between the detected preceding vehicle and the host vehicle 100. The forward distance calculation unit 20 may calculate the distance to the preceding vehicle at predetermined time intervals and transmit the distance to the forward velocity calculation unit 25.

The forward velocity calculation unit 25 may calculate a relative velocity of the preceding vehicle with respect to the host vehicle 100 by calculating a change rate of the distance between the host vehicle 100 and the preceding vehicle over time using the distance between the preceding vehicle and the host vehicle 100 calculated at the predetermined time intervals by the forward distance calculation unit 20. The forward velocity calculation unit 25 may also calculate the velocity of the preceding vehicle by adding or subtracting the relative velocity of the preceding vehicle to or from the velocity of the host vehicle 100 detected by the velocity sensor 15.

Once the host vehicle 100 starts travelling, the forward distance calculation unit 20 and the forward velocity calculation unit 25 may persistently calculate the distance to the preceding vehicle detected by the front detection sensor 13 and the velocity of the preceding vehicle regardless of traveling and stopping of the host vehicle 100.

The congested section determination unit 30 may determine whether a road on which the host vehicle 100 travels is a congested section and may determine the congested section using information input from the front detection sensor 13, the forward distance calculation unit 20, the velocity sensor 15, and the forward velocity calculation unit 25.

The congested section determination unit 30 may determine that the host vehicle 100 is traveling in a congested section when all the following four conditions are satisfied. The first condition is that a forgoing vehicle is detected ahead of the host vehicle 100. The second condition is that the distance between the forgoing vehicle and the host vehicle 100 is less than or equal to a preset distance. The third condition is that the velocity of the host vehicle 100 is less than or equal to a preset velocity. The fourth condition is that the velocity of the preceding vehicle is less than or equal to a preset velocity.

The congested section determination unit 30 may be provided with information on whether a preceding vehicle has been detected by the front detection sensor 13, provided with information on the distance between the preceding vehicle and the host vehicle 100 from the forward distance calculation unit 20, and provided with the velocity of the host vehicle 100 and the velocity of the preceding vehicle from the velocity sensor 15 and the forward velocity calculation unit 25, respectively.

When the congested section determination unit 30 determines that the road is a congested section, the determination result may be provided to the control module 60.

As shown in FIG. 2, when a following vehicle 110 moves sideways, the rear side space determination unit 35 may determine the size of a rear side space formed behind the host vehicle 100 using the information input from the rear detection sensor 14, the right side detection sensor 11, the left side detection sensor 12, and the like. As shown in FIGS. 3 and 4, the rear side space may be defined by a lateral width between the host vehicle 100 and a vehicle traveling in a lane next to the lane in which the host vehicle 100 travels and the distance from the host vehicle 100 to the following vehicle 110 or the emergency vehicle 120. The rear side space forms a travel path along which the emergency vehicle 120 travels.

The host vehicle movement distance calculation unit 40 may calculate a distance that the host vehicle 100 need travel to form a travel path along which the emergency vehicle 120 can travel. To form the travel path, the host vehicle 100 should move to the lane line opposite to the lane line on which the rear side space is formed. Therefore, the host vehicle movement distance calculation unit 40 calculates the distance of travel of the host vehicle 100 to the lane line opposite to the lane line on which the rear side space is formed, with respect to the center of the host vehicle 100.

As shown in FIG. 5, the host vehicle movement distance calculation unit 40 calculates a lateral distance x between the host vehicle 100 and a preceding vehicle traveling ahead of the host vehicle 100 in a next lane toward which the host vehicle 100 should move, and calculates a difference y in lateral position between the center of the following vehicle 110 and the center of the host vehicle 100.

In this operation, the host vehicle movement distance calculation unit 40 may calculate the lateral distance x between the host vehicle 100 and the vehicle traveling in the next lane by calculating a lateral distance between a side corner of the vehicle in the next lane and a side corner of the host vehicle 100, which may be performed using the information detected by the front detection sensor 13 and the right side detection sensor 11 or the left side detection sensor 12. The difference y in lateral position between the center of the following vehicle 110 and the center of the host vehicle 100 may also be measured using a difference in lateral position between one side corner of the following vehicle 110 and one side corner of the host vehicle 100.

That is, according to this embodiment, a vehicle in the next lane may be detected using the image sensor or a non-image sensor such as the radar sensor included in the sensing module 10, and the sensing data thereof may be processed to calculate the lateral distance between a side corner of the vehicle in the next lane and a side corner of the host vehicle 100. Then, the calculated distance may be determined as the lateral distance x between the vehicle in the next lane and the host vehicle 100.

The following vehicle 110 may be detected using a non-image sensor such as the image sensor or the radar sensor included in the sensing module 10, and the sensing data thereof may be processed to calculate the lateral distance between a side corner of the following vehicle 110 and a side corner of the host vehicle 100. Then, the calculated distance may be determined as the difference y in lateral position between the center of the following vehicle 110 and the center of the host vehicle 100.

Then, the host vehicle movement distance calculation unit 40 may determine a host vehicle movement distance based on the difference y between the center of the following vehicle 110 and the center of the host vehicle 100 and the lateral distance x between the vehicle in the next lane and the host vehicle 100.

When the difference y between the center of the following vehicle 110 and the center of the host vehicle 100 is larger than the lateral distance x between the vehicle in the next lane and the host vehicle 100 (y>x), the host vehicle movement distance calculation unit 40 may set the movement distance of the host vehicle 100 to be less than the lateral distance x by a predetermined width. Here, when the difference y between the center of the following vehicle 110 and the center of the host vehicle 100 is larger than the lateral distance x between the vehicle in the next lane and the host vehicle 100, the following vehicle 110 may be considered as having already moved toward a next lane. In this case, there is a risk that the host vehicle 100 will collide with the vehicle in the next lane when the host vehicle 100 is moved by the difference y. Therefore, the host vehicle 100 may be moved by a distance x-a shorter than the lateral distance x, which is the lateral distance between the host vehicle 100 and the vehicle in the next lane, by a predetermined distance.

On the other hand, when the difference y between the center of the following vehicle 110 and the center of the host vehicle 100 is smaller than the lateral distance x between the vehicle in the next lane and the host vehicle 100 (x>y), the host vehicle movement distance calculation unit 40 may set the movement distance of the host vehicle 100 to the difference y. In this case, moving the host vehicle 100 by the difference y will align the center of the following vehicle 110 with the center of the host vehicle 100, as shown in FIG. 6. That is, the host vehicle 100 and the following vehicle 110 will travel in an aligned state and the following vehicle 110 may be considered as having moved enough to form a travel path for the emergency vehicle 120. Therefore, there is no need to move the host vehicle by more than the difference y. However, it is also possible to move the host vehicle 100 by the distance x-a when the difference y between the center of the following vehicle 110 and the center of the host vehicle 100 is smaller than the lateral distance x between the vehicle in the next lane and the host vehicle 100 (x>y).

The front collision prediction unit 45 may determine a risk of front collision of the host vehicle 100 by determining whether there is an obstacle such as a vehicle ahead of and on a front side of the host vehicle 100 according to a result of detection by the front detection sensor 13 and the right or left side detection sensor 11 or 12. When there are obstacles ahead of and on the front side of the host vehicle 100, the front collision prediction unit 45 may determine that there is a risk of front collision of the host vehicle 100 and provide the result of front collision prediction to the control module 60.

The return determination unit 50 may determine whether the host vehicle 100 can return to the original position after the emergency vehicle 120 passes. The return determination unit 50 receives a result of detection from the front detection sensor 13, the rear detection sensor 14, and the right side detection sensor 11 or the left side detection sensor 12 of the host vehicle 100, wherein the right side detection sensor 11 or the left side detection sensor 12 is installed facing in the return direction. When an obstacle is detected ahead or behind in a lane to which the host vehicle 100 is to return as the result of the detection, the return determination unit 50 may determine that the host vehicle 100 cannot return. The return determination unit 50 may provide the determination result to the control module 60.

The V2X communication unit 55 may support vehicle-to-everything (V2X) communication, including vehicle-to-vehicle communication or vehicle-to-infrastructure communication, and receive information on travel of the emergency vehicle 120 from another nearby vehicle or nearby infrastructure equipment. The communication scheme of the V2X communication unit 55 may be Wireless Access in Vehicular Environment (WAVE) at a communication frequency 5.9 GHz, which takes the form of a multi-hop network, but is not limited thereto. The V2X communication unit 55 may provide the received information on travel of the emergency vehicle 120 to the control module 60.

When the congested section determination unit 30 determines that the road on which the host vehicle 100 travels is a congested section, the control module 60 may determine movement of the following vehicle 110 and a vehicle on a side of the host vehicle using the information detected by the rear detection sensor 14, the left side detection sensor 12, and the right side detection sensor 11. When the following vehicle 110 and the vehicle on a side of the host vehicle are moved to the left or right by a preset width or more, the control module 60 may determine that the following vehicle 110 is moved due to travel of the emergency vehicle 120. In addition, the control module 60 may receive information from the V2X communication unit 55 to receive information on travel of the emergency vehicle 120.

Upon determining that the emergency vehicle 120 is traveling, the control module 60 may check whether the rear side space detected by the rear side space determination unit 35 is formed to be large enough to allow travel of a vehicle therethrough. When the rear side space is large enough to allow travel of a vehicle, the control module 60 may determine whether a vehicle assumed to be the emergency vehicle 120 is detected in the rear side space.

When the emergency vehicle 120 enters the rear side space as a result of the determination, the host vehicle movement distance calculation unit 40 is operated to calculate a movement distance of the host vehicle 100. Then, the control module 60 receives, from the front collision prediction unit 45, information on whether a collision with a preceding vehicle is expected when the host vehicle 100 is moved and re-operates the host vehicle movement distance calculation unit 40 to re-calculate a movement distance of the host vehicle 100 when the collision with the preceding vehicle is expected. On the other hand, when it is determined that the host vehicle 100 will not collide with the preceding vehicle, the control module 60 may transmit a command signal to the steering wheel electronic control unit 70 such that the host vehicle 100 can be moved toward a next lane by the host vehicle movement distance.

In addition, when the control module 60 determines that the emergency vehicle 120 has traveled along the rear side space and passed the host vehicle 100 according to the result of detection from the rear detection sensor 14, the right or left side detection sensor 11 or 12, and the front detection sensor 13, it operates the return determination unit 50 to determine whether the host vehicle 100 can return. When the return determination unit 50 determines that the host vehicle 100 can return, the control module 60 may control the steering wheel electronic control unit 70 to cause the host vehicle 100 to return to the host vehicle lane by moving the distance by which the host vehicle 100 has deviated.

The steering wheel electronic control unit 70 allows the host vehicle 100 to move to the left or right by controlling a driving motor configured to operate the steering wheel clockwise and counterclockwise.

The controller, the domain controller, the host vehicle movement distance calculation unit 40, the control module 60, the forward distance calculation unit 20, the forward velocity calculation unit 25, the congested section determination unit 30, the rear side space determination unit 35, the front collision prediction unit 45, the return determination unit 50, the V2X communication unit 55, and the like included in the vehicle cruise control apparatus according to the above-described embodiment may be implemented as some modules constituting the vehicle control system or some modules of the ECUs for the same.

The modules or ECUs constituting the vehicle control system may include a computer program capable of performing a specific function in connection with a processor and a storage device such as a memory. The host vehicle movement distance calculation unit 40 and the control module 60 may be implemented as software modules capable of performing their own functions.

Since such software can be sufficiently coded by those skilled in the art based on the disclosure set forth in this specification, descriptions of specific software forms will be omitted.

Hereinafter, a process of creating a travel path for the emergency vehicle 120 by the autonomous cruise control system according to the configuration above will be described with reference to FIG. 7.

When a vehicle starts to travel (S700), the congested section determination unit 30 checks whether a preceding vehicle is detected, whether a distance between the preceding vehicle and the host vehicle 100 is less than or equal to a preset constant, whether a velocity of the host vehicle 100 is less than or equal to a preset constant, and whether a velocity of the preceding vehicle is equal to or less than the predetermined velocity, and determines that a road is a congested section when the above conditions are all satisfied (S710).

Once the congested section determination unit 30 determines that the road is a congested section, the control module 60 determines whether the following vehicle 110 and a vehicle on a side of the host vehicle are moved by a preset width or more (S720). As shown in FIG. 2, when the following vehicle 110 and the vehicle on the side are moved by the preset width or more, the control module 60 determines that the following vehicle 110 is moved due to travel of the emergency vehicle 120. Then, the control module 60 determines whether the rear side space detected by the rear side space determination unit 35 is formed to be large enough to allow travel of the emergency vehicle 120 (S730). As shown in FIG. 3, when the rear side space is large enough to allow travel of the emergency vehicle 120, the control module 60 may determine whether a vehicle assumed to be the emergency vehicle 120 enters the rear side space (S740). In this operation, the control module 60 may determine whether the emergency vehicle 120 enters the rear side space using the information received through the V2X communication unit 55.

When the emergency vehicle 120 enters the rear side space as a result of the determination as shown in FIG. 4, the host vehicle movement distance calculation unit 40 is operated to calculate a movement distance of the host vehicle 100, as shown in FIG. 5 (S750). Then, when it is determined through the front collision prediction unit 45 that a collision with the preceding vehicle is expected (S760), the host vehicle movement distance calculation unit 40 is re-operated to re-calculate a host vehicle movement distance. When it is determined that the host vehicle 100 will not collide with the preceding vehicle, the steering wheel electronic control unit 70 is controlled such that the host vehicle 100 can be moved toward a next lane by the calculated host vehicle movement distance (S770), as shown in FIG. 6.

When the control module 60 determines that the emergency vehicle 120 has traveled along the rear side space and passed the host vehicle 100, it operates the return determination unit 50 to determine whether the host vehicle 100 can return (S780). When the return determination unit 50 determines that the host vehicle 100 can return, the control module 60 controls the steering wheel electronic control unit 70 to cause the host vehicle 100 to return to the host vehicle lane by being moved by the distance by which the host vehicle 100 has deviated such that the host vehicle 100 can return to the original position thereof (S790). When the return determination unit 50 determines that the host vehicle 100 cannot return to the original position, the control module 60 may maintain the current position of the host vehicle 100 until it is determined that the host vehicle 100 can return to the original position.

As described above, according to the present disclosure, when the emergency vehicle 120 approaches from behind in a congested section during autonomous cruise control, whether the emergency vehicle 120 approaches is determined using the information on the movement of the following vehicle 110, the size of the rear side space, and the like, and the host vehicle 100 is moved so as to create a travel path for the emergency vehicle 120 based on the result of the determination. Accordingly, the emergency vehicle 120 may be allowed to smoothly travel even in the congested section during autonomous cruise control by detecting travel of the emergency vehicle 120 and creating a travel path for the emergency vehicle 120 in the congested section during the autonomous cruise control.

The standard content or standard documents referred to in the embodiments described above have been omitted for the sake of brevity and constitute a part of this specification. Therefore, it is to be understood that addition of a part of the standard content and the standard documents in this specification or the appended claims should be constructed as being within the scope of the present disclosure.

The above embodiments of the present disclosure have been described only for illustrative purposes, and those skilled in the art will appreciate that various modifications and changes may be made thereto without departing from the scope and spirit of the disclosure. Therefore, the embodiments of the present disclosure are not intended to limit, but are intended to illustrate the technical idea of the present disclosure, and the scope of the technical idea of the present disclosure is not to be limited to the embodiments. The scope of the present disclosure shall be construed on the basis of the accompanying claims in such a manner that all of the technical ideas included within the scope equivalent to the claims belong to the present disclosure.

What is claimed is:

1. An autonomous cruise control apparatus comprising:
   a sensing module configured to detect an object adjacent to a first vehicle;
   a vehicle movement distance calculation unit configured to calculate a vehicle movement distance for moving the first vehicle to the left or right using a preset method; and
   a control module configured to control the first vehicle to be moved by the vehicle movement distance when the movement of a following vehicle behind the first vehicle by a preset width or more is detected by the sensing module,
   wherein the vehicle movement distance calculation unit compares a difference (y) in lateral position between a center of the first vehicle and a center of the following vehicle with a lateral distance (x) between the first vehicle and a second vehicle in a lane next to a driving lane of the first vehicle,
   wherein the vehicle movement distance calculation unit sets the vehicle movement distance to a value less than the lateral distance (x) by a predetermined value when the difference (y) is greater than the lateral distance (x), and sets the vehicle movement distance to a value of the difference (y) when the lateral distance (x) is greater than or equal to the difference (y).

2. The autonomous cruise control apparatus of claim 1, wherein the controller further comprises a congested section determination unit configured to determine whether the first vehicle is traveling in a congested section,
   wherein, when the congested section determination unit determines that the first vehicle is traveling in the congested section and movement of the following vehicle behind the first vehicle by the preset width or more in a lateral direction is detected, the control module controls the first vehicle to move.

3. The autonomous cruise control apparatus of claim 2, further comprising:
   a velocity sensor configured to detect a velocity of the first vehicle;
   a forward distance calculation unit configured to calculate a distance between the first vehicle and a preceding vehicle located ahead of the first vehicle; and
   a forward velocity calculation unit configured to calculate a velocity of the preceding vehicle or a relative velocity of the preceding vehicle with respect to the first vehicle,
   wherein, when the preceding vehicle is detected, the velocities of the first vehicle and the preceding vehicle are less than or equal to a preset velocity, and the distance between the first vehicle and the preceding vehicle is less than or equal to a preset constant distance, the congested section determination unit determines that the first vehicle is traveling in the congested section.

4. The autonomous cruise control apparatus of claim 1, further comprising a rear side space determination unit configured to determine whether a rear side space of a predetermined size or more allowing an emergency vehicle to travel therethrough is formed on a rear side of the first vehicle according to a result from the sensing module;
   wherein the control module determines to move the first vehicle when the following vehicle is moved by the preset width or more and the rear side space of the predetermined size or more is formed.

5. The autonomous cruise control apparatus of claim 1, further comprising a front collision prediction unit configured to determine whether there is an obstacle ahead of the first vehicle and on a side to which the first vehicle is to move according to a result of detection from the sensing module and predict a collision between the first vehicle and the obstacle, wherein, when the collision between the first vehicle and the obstacle is expected by the front collision prediction unit, the control module controls the vehicle movement distance calculation unit to re-calculate the vehicle movement distance.

6. The autonomous cruise control apparatus of claim 1, further comprising a return determination unit configured to determine whether the first vehicle is returnable to a previous position according to a result of detection from the sensing module;

wherein, when an emergency vehicle has passed the first vehicle, the control module controls the first vehicle to return to the previous position when return of the first vehicle is allowed as a result of determination from the return determination unit and delays return of the first vehicle for a predetermined time when return of the first vehicle is not allowed.

7. The autonomous cruise control apparatus of claim 1, further comprising:

a vehicle-to-everything (V2X) communication unit configured to collect approach information on an emergency vehicle through communication with another adjacent vehicle or adjacent infrastructure equipment and provide the collected information to the control module.

8. A control method of an autonomous cruise control apparatus, the method comprising:

detecting an object adjacent to a first vehicle with a sensing module;

calculating a vehicle movement distance for moving the first vehicle to the left or right using a preset method; and when movement of a following vehicle behind the first vehicle by a preset width or more is detected, controlling the first vehicle to be moved by the vehicle movement distance, wherein the calculating of the vehicle movement distance comprises:

calculating a difference (y) in lateral position between a center of the first vehicle and a center of the following vehicle and a lateral distance (x) between the first vehicle and a second vehicle in a lane next to the first vehicle;

setting the vehicle movement distance to a value less than the lateral distance (x) by a predetermined value when the difference (y) is greater than the lateral distance (x) and setting the vehicle movement distance to a value of the difference (y) when the lateral distance (x) is greater than or equal to the difference (y).

9. The method of claim 8, further comprising determining whether the first vehicle is traveling in a congested section, wherein the controlling is performed when it is determined that the first vehicle is traveling in the congested section.

10. The method of claim 8, further comprising:

detecting a velocity of the first vehicle;

calculating a distance between the first vehicle and a preceding vehicle located ahead of the first vehicle; and calculating a velocity of the preceding vehicle or a relative velocity of the preceding vehicle with respect to the first vehicle, wherein the determining of whether the first vehicle is traveling in the congested section is determining that the first vehicle is traveling in the congested section when the preceding vehicle is detected, the velocities of the first vehicle and the preceding vehicle are less than or equal to a preset velocity, and the distance between the first vehicle and the preceding vehicle is less than or equal to a preset constant.

11. The method of claim 8, further comprising determining whether a rear side space of a predetermined size or more allowing an emergency vehicle to travel therethrough is formed on a rear side of the first vehicle, wherein the controlling comprises determining to move the first vehicle when the following vehicle is moved by the preset width or more, the rear side space of the predetermined size or more is formed, and entry of an emergency vehicle is detected.

12. The method of claim 8, further comprising determining whether there is an obstacle ahead of the first vehicle and on a side to which the first vehicle is to move according to a result of detection from the sensing module and predicting a collision between the first vehicle and the obstacle, wherein the controlling comprises performing a control operation to re-calculate the movement distance when the collision between the first vehicle and the obstacle is expected.

13. The method of claim 8, further comprising determining whether the first vehicle is returnable to a previous position, wherein, when an emergency vehicle has passed the first vehicle, the controlling comprises:

controlling the first vehicle to return to the previous position when return of the first vehicle is allowed; and delaying return of the first vehicle for a predetermined time when return of the first vehicle is not allowed.

14. The method of claim 8, wherein the controlling comprises:

collecting approach information on an emergency vehicle through communication with another adjacent vehicle or adjacent infrastructure equipment in a manner of vehicle-to-everything (V2X) communication.

* * * * *